United States Patent
Seemann et al.

(10) Patent No.: US 11,878,591 B2
(45) Date of Patent: Jan. 23, 2024

(54) POWER DISTRIBUTOR UNIT FOR A UTILITY VEHICLE AND UTILITY VEHICLE COMPRISING SAID POWER DISTRIBUTOR UNIT

(71) Applicant: ZF FRIEDRICHSHAFEN AG, Friedrichshafen (DE)

(72) Inventors: Frank Seemann, Euerbach (DE); Andre Ehrsam, Bergrheinfeld (DE); Martin Mach, Plzen (CZ); Zbynek Stepan, Plzen (CZ); Vladimír Dvojak, Plzen (CZ); Gabriel Scherer, Deggenhausertal (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/800,162

(22) PCT Filed: Feb. 15, 2021

(86) PCT No.: PCT/EP2021/053640
§ 371 (c)(1),
(2) Date: Aug. 16, 2022

(87) PCT Pub. No.: WO2021/165199
PCT Pub. Date: Aug. 26, 2021

(65) Prior Publication Data
US 2023/0065978 A1 Mar. 2, 2023

(30) Foreign Application Priority Data
Feb. 17, 2020 (DE) ..................... 10 2020 201 902.9

(51) Int. Cl.
*B60L 1/00* (2006.01)
*B60L 58/00* (2019.01)

(52) U.S. Cl.
CPC ............... *B60L 1/003* (2013.01); *B60L 1/006* (2013.01); *B60L 1/20* (2013.01); *B60L 58/00* (2019.02)

(58) Field of Classification Search
CPC .. B60L 1/003; B60L 1/006; B60L 1/20; B60L 58/00; H02M 1/10; H02M 3/28;
(Continued)

(56) References Cited

U.S. PATENT DOCUMENTS 7,057,376 B2 6/2006 Cook
11,104,234 B2 * 8/2021 Wang .................... E02F 9/2091
(Continued)

FOREIGN PATENT DOCUMENTS

DE  10 2010 003 509  10/2011
DE  2011 075 927  11/2012

OTHER PUBLICATIONS

International Search Report issued in corresponding PCT Application PCT/EP2020/087364.
(Continued)

*Primary Examiner* — Hal Kaplan
(74) *Attorney, Agent, or Firm* — Cozen O'Connor (57) ABSTRACT

A power distribution includes first and second inputs, first and second outputs, and a third output configured to connect to a low-voltage vehicle power supply, a high-voltage distributor is connected to the first input and forms the connection between the energy storage and further components of the power distribution. A controller monitors at least the high-voltage distributor and can control components of the power distribution. At least one inverter is arranged in the current path between the high-voltage distributor and at least one of the contacts for the first output, the second output or the second input, a first converter is arranged between the high-voltage distributor and the third output and converts a
(Continued)

DC voltage provided by the high-voltage distributor to a lower DC voltage.

12 Claims, 9 Drawing Sheets

(58) Field of Classification Search
CPC ........ H02M 7/72; H02M 7/219; H02M 7/493; H02J 3/32
USPC .................................................. 307/9.1, 10.1
See application file for complete search history.

(56) References Cited

U.S. PATENT DOCUMENTS

| | | |
|---|---|---|
| 2009/0315393 A1 | 12/2009 | Yeh |
| 2010/0229581 A1 | 9/2010 | Truckenbrod |
| 2013/0221921 A1 | 8/2013 | Ang |
| 2019/0389406 A1 | 12/2019 | Mancini et al. |

OTHER PUBLICATIONS

German Search Report dated Sep. 4, 2020 issued in corresponding application No. 10 2020 201 188.5.

* cited by examiner

POWER DISTRIBUTOR UNIT FOR A UTILITY VEHICLE AND UTILITY VEHICLE COMPRISING SAID POWER DISTRIBUTOR UNIT

CROSS REFERENCE TO RELATED APPLICATIONS

This is a U.S. national stage of International application No. PCT/EP2021/053640, filed on Feb. 15, 2021, which claims priority to German Application No. 10 2020 201 902.9, filed Feb. 17, 2020, the content of each of which is incorporated herein by reference.

BACKGROUND OF THE INVENTION

1. Field of the Invention

The invention is directed to a power distribution unit for utility vehicles, in particular utility vehicles having an electric drive, the utility vehicle having a power takeoff for vehicle bodies or work modules.

2. Description of the Prior Art

In the prior art, utility vehicles are outfitted with an internal combustion engine which delivers mechanical energy directly to a vehicle body via a further mechanical output shaft arranged downstream or converts mechanical energy into hydraulic energy or pneumatic energy via a pump.

SUMMARY OF THE INVENTION

The invention has an object of providing an alternative for supplying a power takeoff of a utility vehicle. Further objects consist in improving safety and usability.

The above-stated object may be met by a power distribution unit for a utility vehicle having at least one power takeoff with an electric machine, having a first input for connecting to an energy storage of the utility vehicle which provides a DC voltage; a second input for connecting to an external power source; a first output for connecting to the power takeoff; a second output for connecting to an external current collector; and a third output for connecting to a low-voltage vehicle power supply; a high-voltage distributor which is connected to the first input and forms the connection between the energy storage and the further components of the power distribution unit; a control device, i.e., controller, which monitors at least the high-voltage distributor and can control components of the power distribution unit; at least one inverter which is arranged in the current path between the high-voltage distributor and at least one of the contacts for the first output, the second output or the second input, and; a first converter which is arranged between the high-voltage distributor and the third output and converts a DC voltage provided by the high-voltage distributor to a lower DC voltage.

Utility vehicles often have a power takeoff for work functions, for example, for tilting a cargo surface, mixing or conveying a cargo, compacting a cargo, driving a work implement and the like. In electrically driven utility vehicles, the mechanical energy required for the power takeoff for movements or for converting into hydraulic, pneumatic or thermal energy is preferably generated by an electric machine. A power distribution unit comprising a plurality of components is provided for the power feed.

The power distribution unit has a first input which is connected to an energy storage of the utility vehicle. The energy storage provides electrical energy, usually in the form of a high-voltage DC output.

The energy storage is connected to a high-voltage distributor by the first input. The high-voltage DC is routed to further components of the power distributor via the high-voltage distributor and a sensor arrangement is provided at the same time which detects the voltage, current, temperature and/or further quantities.

A control device is provided and monitors at least the high-voltage distributor, for example, via the optionally provided sensor arrangement. The further components can also be monitored and possibly also switched by the control device. The control device is advantageously used to prevent overloads, to allow battery management and/or to control the current paths to the components depending on demand so that, correspondingly, hazards can be prevented or identified, the energy storage can be utilized to the optimum extent and/or losses can be reduced.

The power distribution unit also has a second input which is formed as a connection to an external power source. This second input is advantageously provided as a plug-in termination so that an externally supplied power cable can be connected to the power distribution unit. Current can be supplied through the second input and used for charging the energy storage and/or directly for operating the power takeoff in a stationary utility vehicle.

Further, the power distribution unit has a first output to which the power takeoff is connected. The power takeoff is supplied with electrical current for the operation of an electric machine via the first output.

A second output which is formed for the connection of an external consumer is also provided. A DC voltage or AC voltage customary for the location can be outputted via this preferably plug-in termination and is formed in accordance with the plug sockets customary for the location for the corresponding line voltage. Accordingly, the energy storage, possibly in combination with a generator provided in the utility vehicle, can be utilized as a peripheral power generator or power source for electrical devices via a corresponding inverter. Alternatively or additionally, the second output can also be utilized as a charging station for accumulators of corresponding devices.

There is further provided at the power distribution unit a third output via which a low-voltage DC is output. The low-voltage DC can be used for supplying a vehicle electrical system or also for an operator control unit of the power takeoff. The low-voltage DC can further be used for components of the power distribution unit such as the control device, inverter, converter, switching elements and the like.

In order to supply the third output with low-voltage DC, a first converter is arranged between the high-voltage distributor and the third output. In addition to converting from a high-voltage DC to a low-voltage DC, a galvanic separation between the low-voltage vehicle power supply and the energy storage can be achieved by the first converter. This low-voltage DC can likewise be used to supply the components of the power distribution unit. In addition, a low-voltage battery is preferably provided in order to supply the components before or during starting.

The power distribution unit likewise has an inverter with which the high-voltage DC is converted to AC voltage.

Embodiment forms of a power distribution unit are characterized in that the high-voltage distributor is directly connected to the first output. In these cases, a high-voltage DC is correspondingly outputted at the first output and is subsequently correspondingly used or converted in the power takeoff. The more favorable construction of the power distribution unit is advantageous with respect to the utility vehicle and a flexible construction of the electric machine of the power takeoff.

Power distribution units according to alternative embodiment forms are characterized in that a second converter is arranged between the high-voltage distributor and the first output. An advantageous galvanic separation between the energy storage and the power takeoff for protecting the energy storage can be carried out by the second converter, and a defined DC voltage can be supplied at the first output and/or further components possibly independent from the voltage of the energy storage. By a defined DC voltage, standardized interfaces can be provided regardless of the characteristics of the energy storage.

Embodiment forms of a power distribution unit are characterized in that an inverter which provides an AC voltage required for the power takeoff is arranged before the first output. A conventional AC voltage can be provided via an inverter to facilitate a standardized interface for the power takeoff and the construction of the power takeoff at the same time.

Power distribution units according to embodiment forms are characterized in that separate inverters are provided for the second output and the second input. As a rule, AC voltages are tapped or applied at the second output and second input, respectively. Separate inverters are provided for the second output and the second input in order to enable a simultaneous operation, the configuration thereof and/or different voltages. The separate inverters can be connected directly to the high-voltage distributor, or one or more second converters can be interposed.

Further embodiment forms of a power distribution unit are characterized in that a shared inverter is provided for the second output and the second input. Since a line voltage customary for the location can be applied at the second output as well as the second input, both contacts can also be connected to the high-voltage distributor via a shared inverter. This reduces the quantity of required components.

Preferred embodiment forms are characterized in that the inverter is configured bidirectional. The shared inverter is advantageously constructed bidirectional in order to map the second output and the second input.

Power distribution units according to embodiment forms are characterized in that a shared inverter is provided for the first output and the second output. The same AC voltage or, in the case of a polyphase AC voltage, at least one partial phase thereof is advantageously applied at the second output. Accordingly, the quantity of components can be minimized by a shared inverter for the first output and second output. In accordance with the embodiment forms already mentioned in which the second output and the second input share an inverter, a shared inverter can also be provided for the first output, second output and second input.

Embodiment forms of a power distribution unit are characterized in that at least two of the contacts for the first output, the second output and the second input are connected to the further components of the power distribution unit via a changeover switch. In particular, when using shared components in the power distribution unit, the contacts are alternately connected to the shared component. In order to successfully change between the individual contacts, multiway switching is provided between these individual contacts and the shared component. The multiway switching can be actuated manually or via a control, in particular via the control device. Accordingly, a multiway switching can also be provided to switch between the first output, the second output and the second input.

Power distribution units according to embodiment forms are characterized in that a plurality of second outputs is provided. For flexible use as an energy source, a plurality of identical contacts can be provided for connecting to a plurality of devices, for example.

Alternatively or in addition, a plurality of different contacts is advantageously provided. Preferred embodiment forms are provided with a plug-in termination for a polyphase AC voltage and at least one plug-in termination is provided for a partial phase of the polyphase AC voltage. It is also possible to provide plug-in terminations for direct current of a first or possibly second converter provided in the power distributor or also additionally a third converter. These plug-in terminations for direct current can likewise be configured as charging contacts for electrical devices operated by accumulators.

Embodiment forms of a power distribution unit are characterized in that the second output and the second input are formed by a contact.

In order to enable charging of the energy storage from the line voltage customary for the location, the second input or, in case of a plurality of second inputs, one of the second inputs can be configured with a plug-in termination customary for the location. Since a corresponding plug-in termination is also used for electrical equipment, a shared contact can be provided for the second output and second input. The electrical current direction can be controlled or selected via suitable circuitry and/or optional multiway switching.

A further aspect of the invention is a utility vehicle with a power distribution unit according to a described embodiment form and a power takeoff with an electric machine. The advantages mentioned above are achievable by providing a power distribution unit according to the invention in a utility vehicle.

The features of the embodiment forms may be combined in any manner.

BRIEF DESCRIPTION OF THE DRAWINGS

In the following, the invention will be explained in more detail with reference to the figures. Like or similar elements are designated with consistent reference numerals. In particular.

DETAILED DESCRIPTION OF THE PRESENTLY PREFERRED EMBODIMENTS

FIGS. 1 to 8 all show the power distribution unit 1 schematically. A plurality of contacts are provided at the power distribution unit 1 of which a first input E1 and second input E2 and a first output A1, second output A2 and third output A3 are shown.

Shown at the first input E1 is an energy storage 2 which is connected to the first input E1. Individual lines for the two poles are shown schematically. In the depicted embodiment example, the energy storage 2 is shown as a high-voltage battery or high-voltage accumulator.

In contrast, the second input E2 is shown schematically as a contact which is configured, for example, as a polyphase plug-in termination for electrical plug-in terminations that are customary for the location or specific to a device. The power distribution unit 1 is connectable to an external power source via the second input E2 in order, for example, to charge the energy storage 2 and/or, in stationary applications, to provide the power supply of the utility vehicle.

At least one electric machine 3 of a power takeoff is provided at the first output A1 of the power distribution unit 1.

The second output A2 for an external current collector is shown as a schematic contact analogous to the second input E2.

A power supply distributor 4 which supplies power to the vehicle electrical system of the utility vehicle is shown at the third output A3.

The embodiment examples according to FIGS. 1 to 8 further have in common that the power distribution unit 1 comprises a control device 5 with which at least individual components can be monitored and/or controlled or adjusted. For example, parameters such as temperature, current, voltage, contact utilization and the like can be detected and components can be switched on or off or their performance can be controlled.

The power distribution unit 1 further has a high-voltage distributor 6 which is connected to the first input E1 and to further components of the power distribution unit 1. The DC voltage applied by the energy storage 2 is selectively and/or simultaneously applied to further components of the power distribution unit 1 via the high-voltage distributor 6.

A first converter K1 is provided between the high-voltage distributor 6 and the third output A3, a voltage of the energy storage 2 applied via the high-voltage distributor 6 being transformed by the first converter K1 to a DC voltage required for the vehicle electrical system. Energy storages 2 in the form of a high-voltage battery have a voltage between 60V and 800V depending on construction, whereas a vehicle electrical system is generally operated at 12V or 24V.

Figure 1:
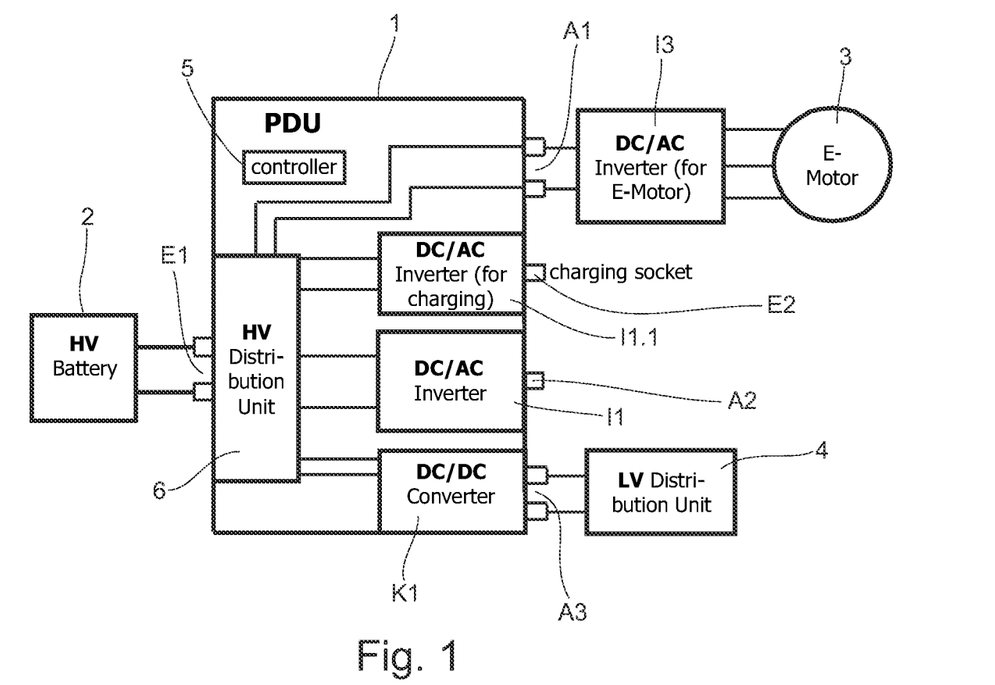
FIGS. 1 to 8 schematically show an embodiment example of a power distribution unit.

The embodiment example shown in FIG. 1 comprises an inverter I1 which is arranged between the high-voltage distributor 6 and the second output A2. The DC voltage provided by the high-voltage distributor 6 or the energy storage 2, respectively, is converted into an AC voltage required for an external consumer via the inverter I1.

Also, a further inverter I1.1 is provided, this further inverter I1.1 being arranged between the high-voltage distributor 6 and the second input E2. The AC voltage which can be optionally supplied via the second input E2 is correspondingly transformed by the further inverter I1.1 into a DC voltage and fed to the high-voltage distributor 6. The supplied current can be used to charge the energy storage 2 and/or routed directly to further components of the power distribution unit 1.

In the embodiment example shown in FIG. 1, a separate inverter 13 is provided, this separate inverter 13 being arranged between the first output A1 and an electric machine 3 of the power takeoff. The voltage provided by the power distribution unit 1 is converted by this separate inverter 13 for an AC voltage suitable for the electric machine 3. By providing a separate inverter 13 associated with the electric machine, the same power distribution unit 1 can be used for power takeoffs with different electric machines, which is advantageous particularly for platform-based utility vehicles with different bodies.

Figure 2:
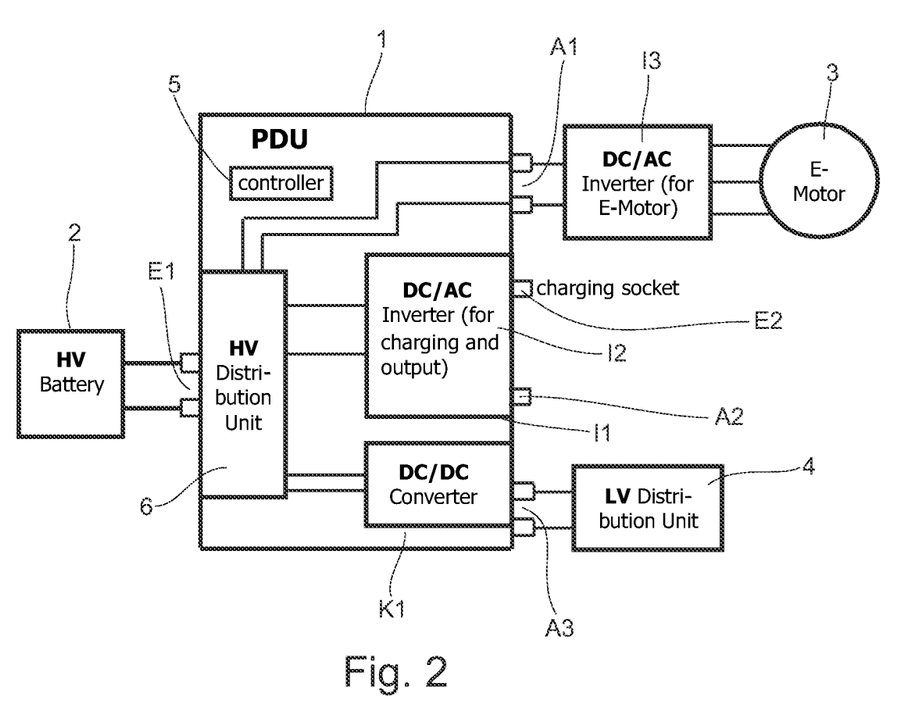

The embodiment example shown in FIG. 2 is substantially identical to the example shown in FIG. 1, for which reason reference is made to the above description, except that the inverter I1 associated with the second output A2 and the further inverter I1.1 associated with the second input E2 have been replaced by a shared bidirectional inverter I2. The quantity of components can be reduced in this way. Depending on the type of construction of the bidirectional inverter I2, the second input E2 and the second output A2 can be used simultaneously or only alternately. In particular, if the second input E2 and second output A2 are not to be operated simultaneously, the two contacts can possibly be formed by an individual plug-in termination, and an automatic or user-defined switching can be carried out between input and output.

Figure 3:
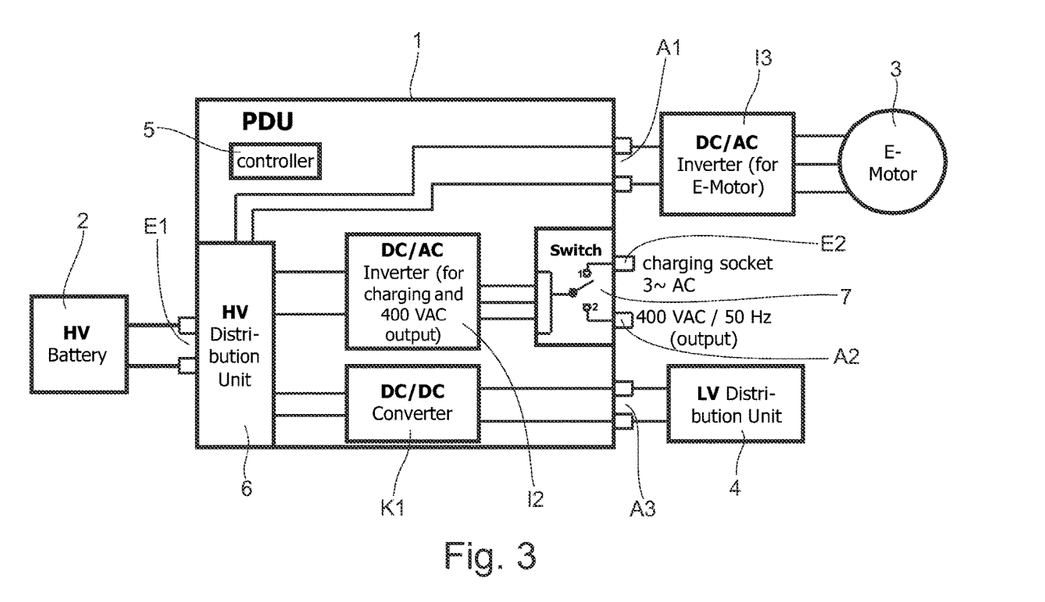

FIG. 3 shows a construction which is basically identical to that in FIG. 2, but a changeover switch 7 is arranged additionally between a bidirectional inverter I2 and a second input E2 and second output A2. The changeover switch 7 can make an electric connection between the bidirectional inverter I2 and either the second input E2 or the second output A2. The changeover switch 7 can define the working direction of the bidirectional inverter I2 either directly or via the control device 5. Alternatively, the changeover switch 7 can also be switched via the control device based on measurement values, for example, voltage applied to the contacts or the like.

Figure 4:
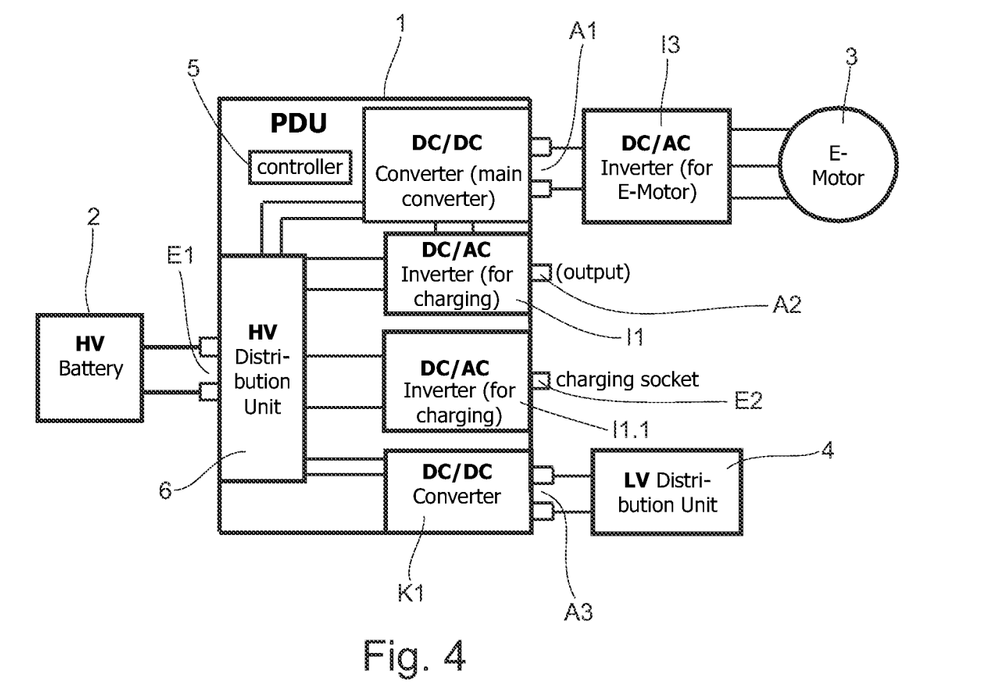

In FIG. 4, a second converter K2 is provided between the first output A1 and the high-voltage distributor 6. This second converter K2 transforms the DC voltage across the high-voltage distributor 6 or the energy storage 2 to a different DC voltage required for the power takeoff. In so doing, it is advantageous that the same power takeoffs can possibly be used for different vehicles with different energy storages 2.

Further in FIG. 4, the inverter I1 for the second output A2 is also not connected to the high-voltage distributor 6 directly but rather via the second converter K2. Alternatively, the inverter I1 can also be connected directly to the high-voltage distributor 6.

In contrast, the further inverter I.1.1 in FIG. 4 is directly connected to the high-voltage distributor 6. In this case, it is also alternatively possible to connect the further inverter I1.1 to the high-voltage distributor 6 likewise via the second converter K2 if required.

Figure 5:
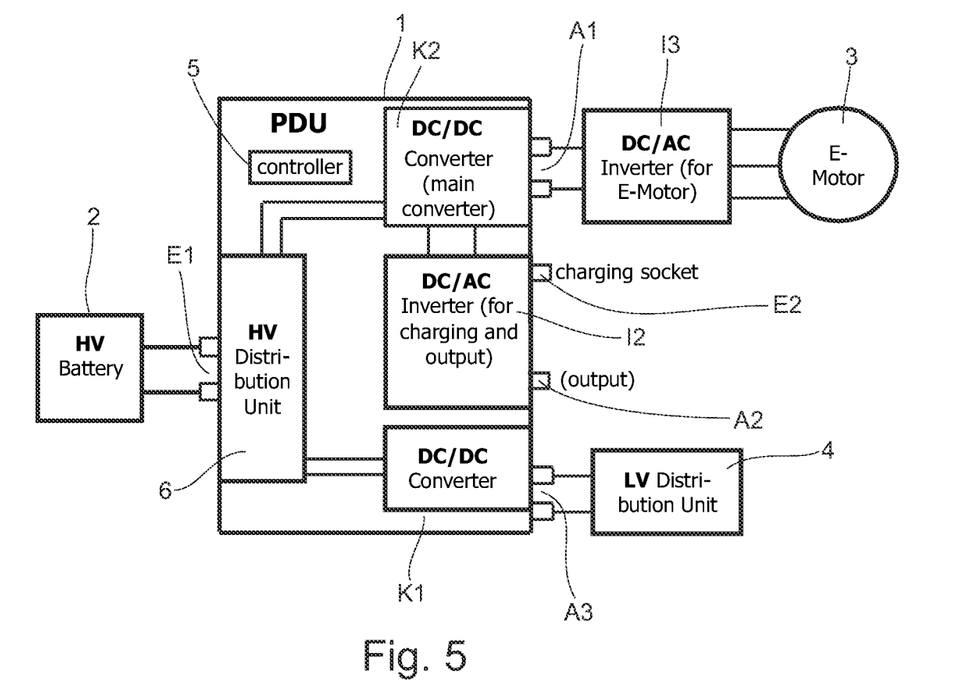

FIG. 5 shows a construction analogous to that shown in FIG. 4. In this case, the inverter I1 and the further inverter I1.1 are replaced by a shared bidirectional inverter I2 as is also the case, e.g., in the exemplary embodiment shown in FIG. 2, so that the quantity of components is reduced. The second converter K2 must correspondingly also be usable bidirectionally.

Alternatively, the bidirectional inverter I2 can also be connected directly to the high-voltage distributor 6 in this embodiment example depending on the output voltage of the second converter K2 and the utilized inverter I1; I1.1; I2.

Figure 6:
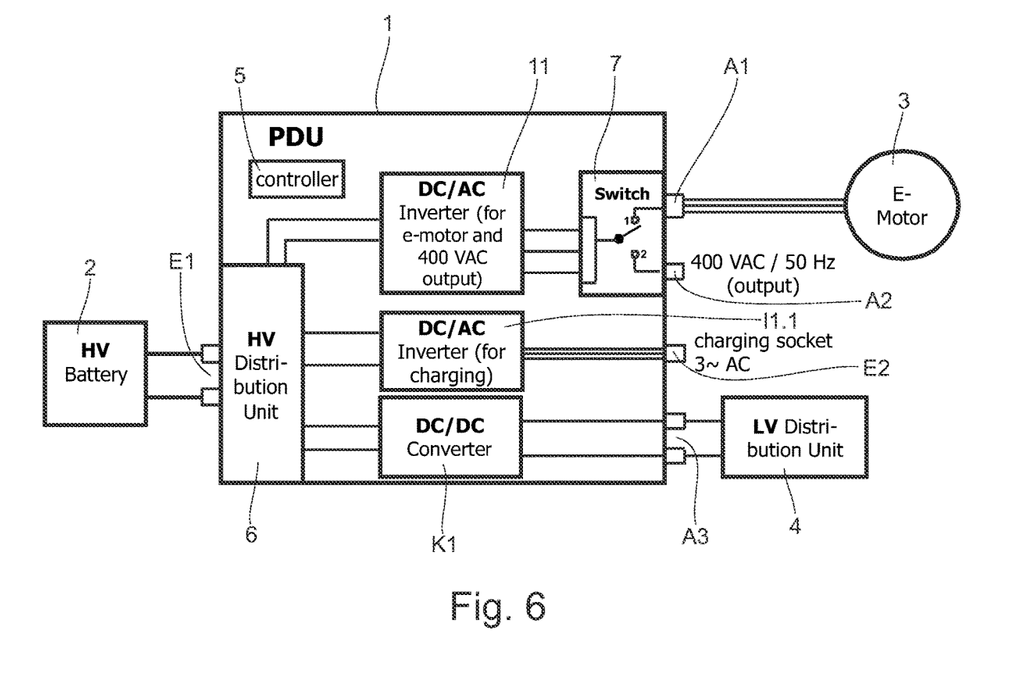

In contrast to the previous embodiment examples, no separate inverter 13 is provided in the embodiment example shown in FIG. 6. An inverter I1 whose output side is connected to a changeover switch 7 is provided. The inverter I1 is correspondingly connectible via the changeover switch 7 to the first output A1 and therefore to the power takeoff or the electric machine 3 thereof or to the second output A2. The further construction is analogous to FIG. 1 or FIG. 4, for example.

Accordingly, the power takeoff of the power distribution unit 1 can be supplied directly by an AC voltage required for the electric machine 3, which correspondingly reduces the components and installation space in the power takeoff.

Figure 7:
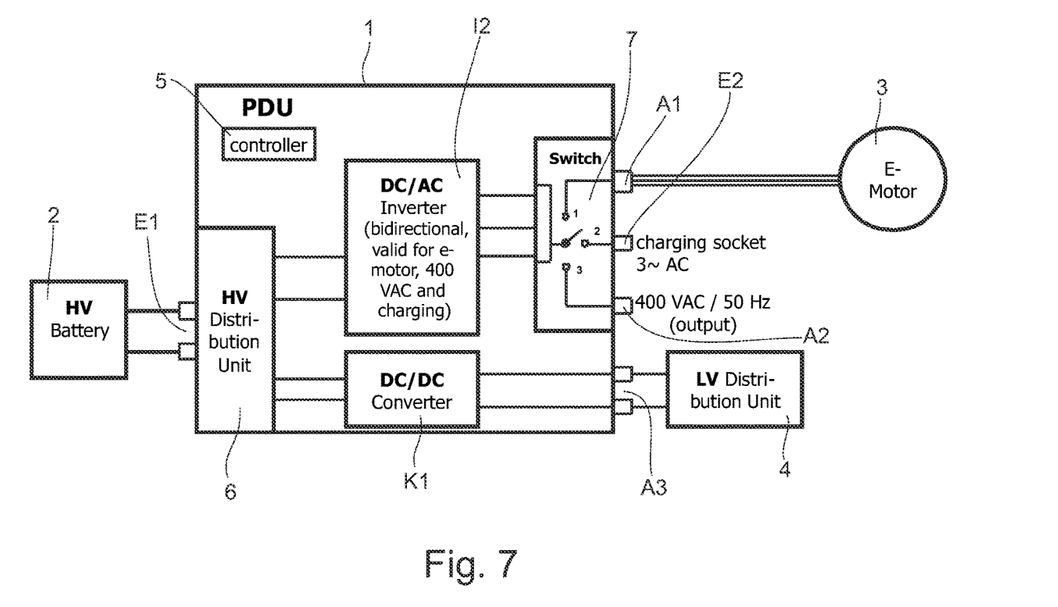

Vis-à-vis FIG. 6, a bidirectional inverter I2 is again provided in FIG. 7 which replaces both the inverter I1 and the further inverter I1.1. A connection can correspondingly be configured to the first output A1, second output A3 or second input E2 via the changeover switch 7.

Figure 8:
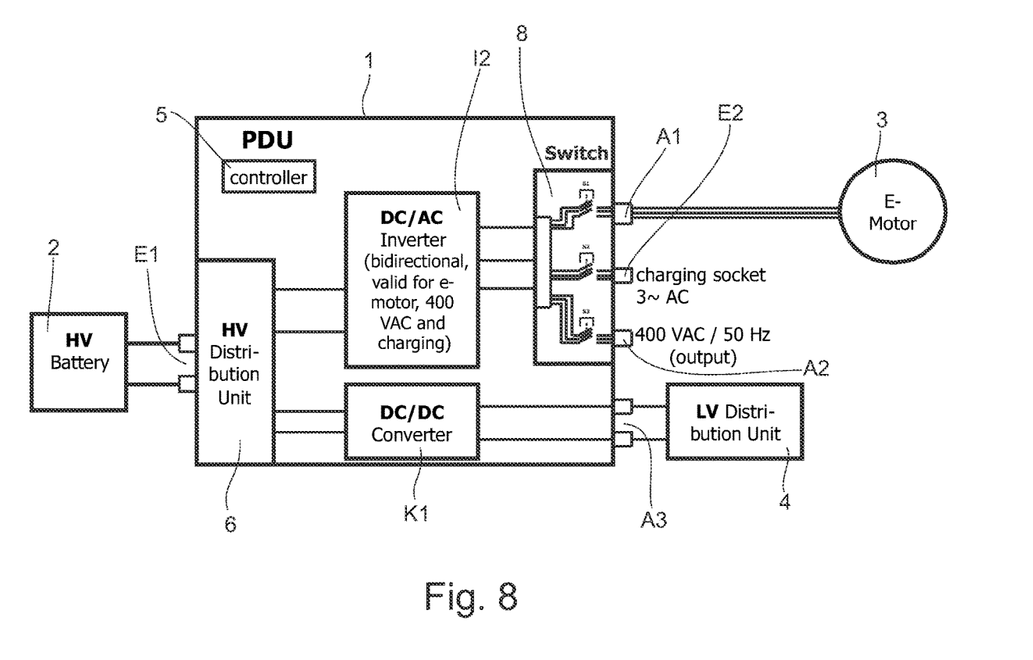

The embodiment example in FIG. 8 corresponds to FIG. 7, but the changeover switch 7 has been replaced by a selector unit 8. A connection of the bidirectional inverter I2 to any of the various contacts A1; A2; E2 can be produced with the selector unit 8. Simultaneous connections are also possible.

The selector unit 8 can be constructed as a demand-driven activation or also as an interrupter or breaker for disconnecting contacts which are not needed or which are defective.

Of course, a selector unit 8 can also be provided in the other embodiment examples instead of a changeover switch 7 as provided in FIG. 8.

Figure 9:
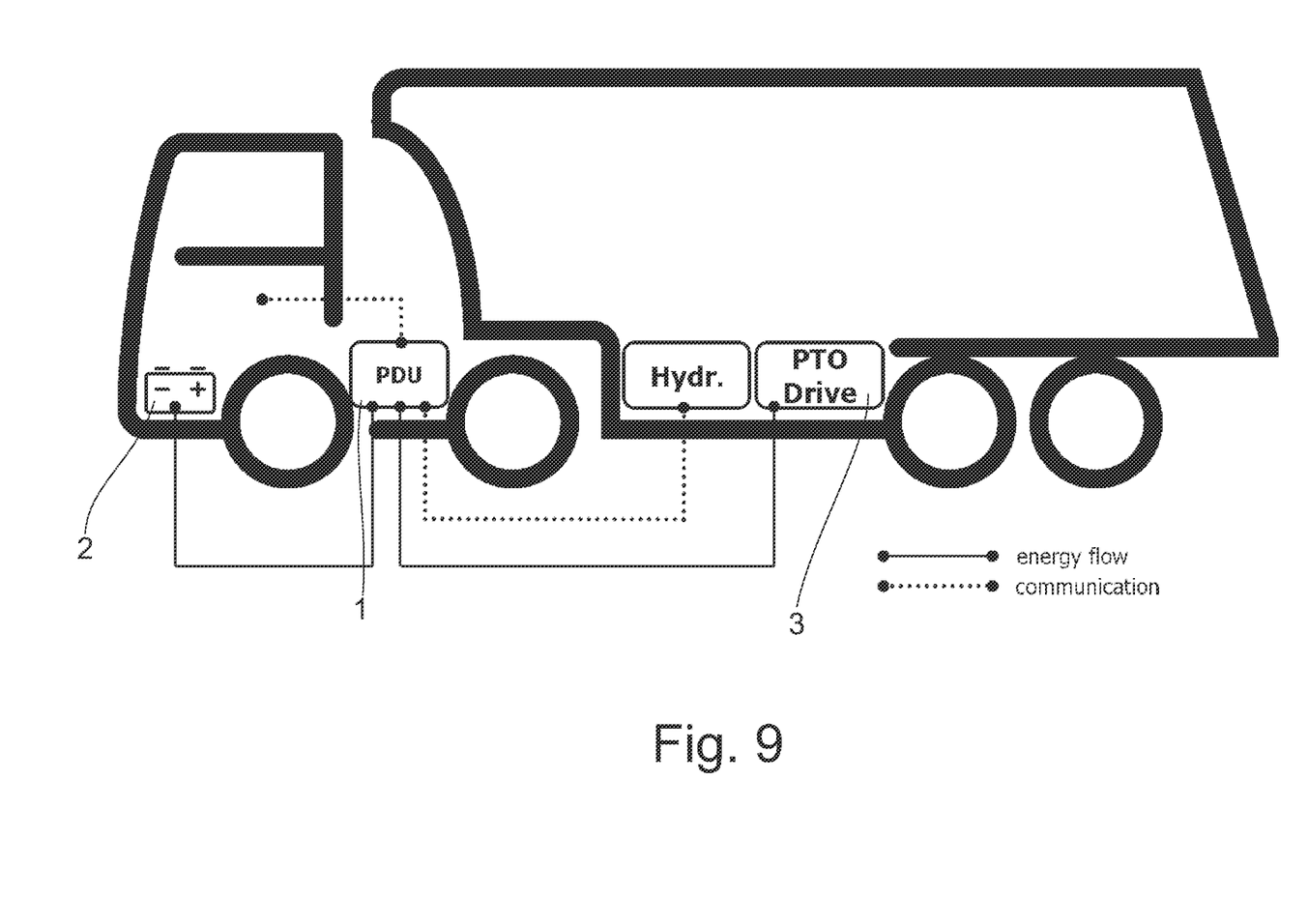
FIG. 9 schematically shows an embodiment example of a utility vehicle having a power distribution unit.

FIG. 9 shows an exemplary utility vehicle, in this example a semitractor, to which a trailer with a power takeoff is coupled, in this example for a dump truck.

A power distribution unit 1 and an energy storage 2 which are electrically connected to one another via a powerline is shown schematically in a utility vehicle.

A power takeoff with an electric machine 3, in this case, for example, for a hydraulic pump, is provided at the trailer. The power takeoff is electrically conductively connected to the power distribution unit 1 also by a powerline. The powerline is preferably constructed as a cable which is connected to the power takeoff and which has a plug socket which is connected to a first output A1 configured as a corresponding mating piece.

In addition, a data link is also provided, for example, between the power takeoff and power distribution unit to allow a flow of information. Sensor data and/or control commands, for example, can be transmitted via the data link.

It will be appreciated that other vehicle bodies are also possible aside from the depicted example of a dump truck trailer. The invention is also not limited to tractors but rather comprehends vehicles of any kind such as trucks, mobile cranes, construction machinery and other utility vehicles.

Further, a plurality of contacts, also a variety of contacts, can also be provided for the second output, for example, such as plug-in connectors with different quantities of phases or voltages, preferably corresponding to the line voltages customary for the location. For Europe, for example, a three-phase plug and three-phase socket with 400V and one or more power sockets with 230V single phases. For other regions, correspondingly diverging, such as 120V single phase and 240V single phase for America or 127V/220V or 220V/380V for China. The frequency also corresponds to the frequency of the local line voltage, usually 50 Hz or 60 Hz.

Further, the invention is also not limited to the embodiments described herein. As has been stated above, advantageous features can also be provided in isolation or in combination with one another.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto

REFERENCE NUMERALS 1 power distribution unit
2 energy storage
3 electric machine (power takeoff)
4 vehicle power supply distributor
5 control device
6 high-voltage distributor
7 changeover switch
8 selector unit
E1 first input
E2 second input
A1 first output
A2 second output
A3 third output
I1 inverter
I1.1 further inverter
I2 (bidirectional) inverter
13 (separate) inverter
K1 first converter
K2 second converter

The invention claimed is:

1. A power distribution (1) for a utility vehicle having at least one power takeoff with an electric machine (3), comprising:
    a first input (E1) configured to connect to an energy storage (2) of the utility vehicle, the energy storage (2) being configured to provide a DC voltage;
    a second input (E2) configured to connect to an external power source;
    a first output (A1) configured to connect to the power takeoff;
    a second output (A2) configured to connect to an external current collector;
    a third output (A3) configured to connect to a low-voltage vehicle power supply;
    a high-voltage distributor (6) connected to the first input (E1) and forming the connection between the energy storage (2) and further components of the power distribution (1);
    a controller (5) configured to monitor at least the high-voltage distributor (6) and further configured to control components of the power distribution (1);
    at least one inverter (I1; I1.1; I2) arranged in the current path between the high-voltage distributor (6) and at least one of the contacts for the first output (A1), the second output (A2) or the second input (E2); and
    a first converter (K1) arranged between the high-voltage distributor (6) and the third output (A3) and converts a DC voltage provided by the high-voltage distributor (6) to a lower DC voltage.

2. The power distribution (1) according to claim 1, wherein the high-voltage distributor (6) is directly connected to the first output (A1).

3. The power distribution (1) according to claim 1, wherein a second converter (K2) is arranged between the high-voltage distributor (6) and the first output (A1).

4. The power distribution (1) according to claim 1, wherein an inverter (I1; I2) of the at least one inverter (I1; I1I; I2) is configured to provide an AC voltage required for the power takeoff and arranged before the first output (A1).

5. The power distribution (1) according to claim 1, wherein separate inverters (Il; I1.1) are provided for the second output (A2) and the second input (E2).

6. The power distribution (1) according claim 1, wherein the inverter (Il; I1.1; I2) is provided for the second output (A2) and the second input (E2).

7. The power distribution (1) according to claim 6, wherein the inverter (2) is configured bidirectional.

8. The power distribution (1) according to claim 7, wherein the inverter (Il; I2) is provided for the first output (A1) and the second output (A2).

9. The power distribution (1) according to claim 1, wherein at least two of the contacts for the first output (A1), the second output (A2) and the second input (E2) are connected to the further components of the power distribution (1) via a changeover switch (7).

10. The power distribution (1) according to claim 1, wherein a plurality of second outputs (A2) is provided.

11. The power distribution (1) according to claim 1, wherein the second output (A2) and the second input (E2) are formed by a contact.

12. A utility vehicle having the power distribution (1) according to claim 1 and a power takeoff with an electric machine (3).

\* \* \* \* \*